(12) United States Patent
Leonov

(10) Patent No.: US 11,243,916 B2
(45) Date of Patent: Feb. 8, 2022

(54) AUTONOMOUS REDUNDANCY MITIGATION IN KNOWLEDGE-SHARING FEATURES OF A COLLABORATIVE WORK TOOL

(71) Applicants: Atlassian Pty. Ltd., Sydney (AU); Atlassian Inc., San Francisco, CA (US)

(72) Inventor: Nikita Leonov, San Francisco, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/421,544

(22) Filed: May 24, 2019

(65) Prior Publication Data

US 2020/0272606 A1    Aug. 27, 2020

Related U.S. Application Data

(60) Provisional application No. 62/811,390, filed on Feb. 27, 2019.

(51) Int. Cl.
*G06F 40/30*     (2020.01)
*G06F 16/176*    (2019.01)
*G06F 16/174*    (2019.01)
*G06Q 10/10*     (2012.01)

(52) U.S. Cl.
CPC ........ *G06F 16/1767* (2019.01); *G06F 16/174* (2019.01); *G06F 40/30* (2020.01); *G06Q 10/101* (2013.01)

(58) Field of Classification Search
CPC .... G06F 16/1767; G06F 16/174; G06F 40/30; G06F 40/274
See application file for complete search history.

(56) References Cited

U.S. PATENT DOCUMENTS

| | | | |
|---|---|---|---|
| 2011/0153686 A1* | 6/2011 | Campbell | G06Q 30/02 707/812 |
| 2014/0012795 A1* | 1/2014 | Antebi | G06N 5/022 706/47 |
| 2014/0089330 A1* | 3/2014 | Cui | G06F 16/951 707/749 |
| 2014/0163953 A1* | 6/2014 | Parikh | G06F 40/274 704/9 |
| 2018/0053116 A1* | 2/2018 | Cai | G06F 16/353 |
| 2018/0067865 A1* | 3/2018 | Ahr | G06F 12/0891 |

* cited by examiner

*Primary Examiner* — Beau D Spratt
(74) *Attorney, Agent, or Firm* — Brownstein Hyatt Farber Schreck, LLP

(57) ABSTRACT

A collaborative work tool configured to determine similarity between an input provided by a user and content already received by the collaborative work tool. If a similarity is determined, the collaborative work tool can provide a visual indication to the user to alert the user that the user may be entering redundant data.

15 Claims, 7 Drawing Sheets

US 11,243,916 B2

AUTONOMOUS REDUNDANCY MITIGATION IN KNOWLEDGE-SHARING FEATURES OF A COLLABORATIVE WORK TOOL

CROSS-REFERENCE TO RELATED APPLICATION(S)

This application is a non-provisional patent application of, and claims the benefit to, U.S. Provisional Patent Application No. 62/811,390, filed Feb. 27, 2019, and titled "Autonomous Redundancy Mitigation in Knowledge-Sharing Features of a Collaborative Work Tool," the disclosure of which is hereby incorporated herein by reference in its entirety.

TECHNICAL FIELD

Embodiments described herein relate to collaborative work tools and, in particular, to systems and methods for reducing input of redundant information to knowledge-sharing features of a collaborative work tool.

BACKGROUND

An organization can leverage a collaboration tool that is accessible by many individuals to facilitate completion of work related to a goal. Many conventional collaboration tools and interfaces include knowledge-sharing features—such as comment sections, forums, knowledge stores, and the like—that can be reviewed by a user of the collaboration tool to determine whether a problem encountered by that user has been previously solved or otherwise addressed by another user.

In many cases, however, processes of reviewing and understanding content stored in various knowledge-sharing features of a collaboration tool may be time and resource consuming for some users. As a result, many users of conventional collaboration tools and systems prefer to avoid leveraging knowledge-sharing features and, instead, prefer to add content to a knowledge-sharing feature that may be duplicative of, and/or redundant to, content already added to the knowledge-sharing feature.

SUMMARY

Embodiments described generally reference collaborative work tools configured to compare, in real time, user inputs provided by a user to content already received by, and/or stored by, the collaborative work tool. Upon identifying a similarity between content entered by the user and existing content, the collaborative work tool can notify the user that the user may be inputting redundant information and/or that content relevant to the user may exist in the system.

For example, some embodiments described herein generally relate to methods for reducing redundancy in a collaborative work tool. An example method includes the operations of: rendering an input area in a graphical user interface of a client application communicably coupled to a host service to receive a user input; receiving, at the host service of the collaborative work tool, a partial input being provided by a user to a knowledge-sharing feature of the collaborative work tool via the client application; determining a first statistical likelihood that the partial input is a first input type based on a first heuristic; determining a second statistical likelihood that the partial input is a second input type based on a second heuristic; selecting the first input type or the second input type based on a greater of the first statistical likelihood and the second statistical likelihood; identifying a previously-received input to the knowledge-sharing feature that corresponds to a selected input type and based on a determination that the previously-received input exhibits a semantic similarity to the partial input; the semantic similarity exceeding a threshold; and providing a visual indication to the user that the partial input corresponds to at least one previously-received input.

Additional embodiments include a configuration in which: the first input type is an interrogative input type; the second input type is an informative input type; the first heuristic is a first determination that the partial input contains interrogative language, structure, punctuation, or phrasing; and the second heuristic is a second determination that the partial input does not contain interrogative language, structure, punctuation, or phrasing. In these examples, upon the first determination, the method increases the first statistical likelihood that the partial input is the interrogative input type and decreases the second statistical likelihood that the partial input is the informative input type. Similarly, upon the second determination, the method increases the second statistical likelihood that the partial input is the informative input type and decreases the first statistical likelihood that the partial input is the interrogative input type.

Some embodiments include a configuration in which the second determination further includes the operation of: determining that the partial input includes a reference to at least one previously-received input. In this example, upon the second determination, the method increases the second statistical likelihood that the partial input is the informative input type.

Some embodiments include a configuration in which the second determination further includes the operation of: determining whether the partial input includes at least a threshold number of words or terms. Upon the second determination, the method increases the second statistical likelihood that the partial input is the informative input type.

Some embodiments include a configuration in which the second heuristic corresponds to a second determination of whether the partial input is tagged with a selected tag. In these examples, upon the second determination, the method increases the second statistical likelihood that the partial input is the informative input type.

Some embodiments include a configuration in which the second heuristic corresponds to a second determination of whether the partial input links to another input stored by the knowledge-sharing feature.

Some embodiments include a configuration in which the second input type is a negligible input type.

Some embodiments include a configuration in which the second input type is an informative input type.

Some embodiments include a configuration in which providing a visual indication includes instructing the client application to provide a notification to the user.

Some embodiments include a configuration in which providing a visual indication includes instructing the client application to provide a link to the previously-received input.

Some embodiments include a configuration in which the previously-received input includes one or more of an article of a knowledge store, a comment in a comment section, a message stored by a messaging platform, or a forum post.

Embodiments described herein generally reference method for reducing redundancy in a collaborative work tool database, the method including receiving, at a client application of a collaborative work tool, a first input provided by a user to the collaborative work tool, determining, by the client application, a statistical likelihood that a partial input is a selected input type based on a determination of whether the first input contains interrogative language, structure, punctuation, or phrasing, selecting a second input, previously received by the client application, having the selected input type and based on a determination that the second input exhibits semantic similarity to the partial input, the semantic similarity exceeding a threshold, and providing a visual indication to the user that emphasizes the second input.

Some embodiments include a configuration in which the selected input type is an interrogative input type when it is determined that the first input contains interrogative language, structure, punctuation, or phrasing.

Some embodiments include a configuration in which the selected input type is an informative input type when it is determined that the first input does not contain interrogative language, structure, punctuation, or phrasing.

Some embodiments include a configuration in which the first input is provided to a knowledge-sharing feature of the collaborative work tool.

Further embodiments described herein generally relate to a collaborative work tool for emphasizing existing content to a user of a client application on a client device communicably coupled to the collaborative work tool. The collaborative work tool includes a host service and a database (communicably coupled to the host service). In these embodiments, the host service is configured to receive an input from the user via the client application on the client device, classify the input as an input type selected from one of a first input type or a second input type, access the database to identify a previously-received input of the selected input type (the previously-received input having a sematic similarity to the input that exceeds a threshold), and generate a signal to the client application via the client device to display the previously-received input on the client application and to visually emphasize the previously-received input to the user.

Some embodiments include a configuration in which the new input and the previously-received input are each comments in a comment section of a knowledge-sharing feature of the collaborative work tool.

Some embodiments include a configuration in which the new input includes a partial user input received while the user continues to provide input to the client application.

Some embodiments include a configuration in which visually emphasizing the previously-received input to the user includes sending a signal from the host service to the client application to provide a notification to the user.

Some embodiments include a configuration in which the first input type is an interrogative input type, and the second input type is an informative input type.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
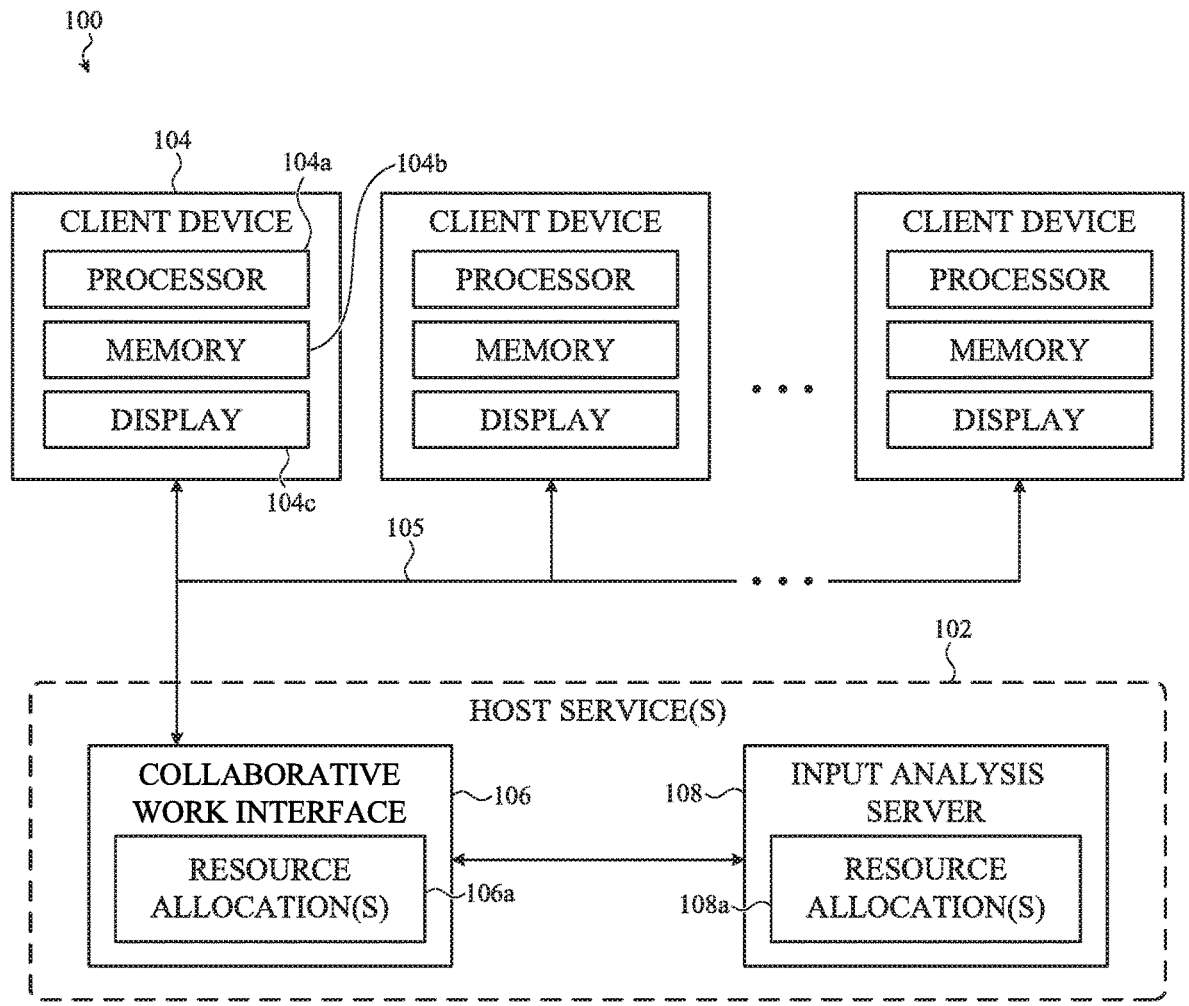
FIG. 1 is a schematic representation of a collaborative work tool, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

A collaborative work tool, as described herein, is a project management tool that can be implemented in whole or in part as software executed by a virtual or physical server or other computing appliance that provides a team of individuals with a means for communicating and exchanging information with one another.

In some examples, a collaborative work tool is configured for use by a software development team to exchange information that can facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs"). In other cases, a collaborative work tool can be configured for non-software related purposes, such as for use by a human resources team, an information technology support group, and so on. It may be appreciated that a collaborative work tool, such as described herein can be used to exchange files or information, facilitate text, audio, or video communication, or any other suitable collaboration or communication purpose.

In this manner, a collaborative work tool increases efficiency of a team of individuals working on a common goal or project by increasing the speed and efficiency by which information is shared between team members.

Embodiments described herein relate to systems and methods for providing one or more visual indications to a user of a collaborative work tool that the user may be entering redundant and/or duplicative information into that collaborative work tool. In particular, embodiments described herein relate to systems and methods for reducing entry of redundant information to knowledge-sharing features implemented by a collaborative work tool. Example knowledge-sharing features include, but are not limited to, comment sections, forums, knowledge stores (e.g., "wikis"), databases, and the like.

The systems and methods described herein may be particularly useful to allow users reviewing information-dense knowledge-sharing features (herein, simply, "knowledge-sharing features") to retrieve relevant information in a time-efficient manner.

In some instances, as described herein, the embodiments may be directed to systems and methods of determining a likelihood that input provided by a user is semantically or otherwise related to content stored in a database associated with a knowledge-sharing feature of a collaborative work tool. If the determined likelihood satisfies a threshold, the system provides a visual indication to the user that the input provided by the user may already be stored by the system. In further examples, if the determined likelihood satisfies the threshold (or another, different, threshold), the system can provide a content recommendation to that user.

The content recommendation may be, without limitation: a reference to an existing entry in a database associated with the knowledge-sharing feature; a suggestion to the user to review a particular forum post, comment, or knowledge store entry; a suggestion to the user to provide a different input; and so on. In this manner, a system, such as described herein, can prevent redundant data entry or user input to knowledge-sharing features of a collaborative work tool.

In one specific example, a user of a collaborative work tool may access a comment section of the collaborative work tool (e.g., a comment section is understood to be one example of a knowledge-sharing feature, such as described herein) in order to interact with other individuals familiar with a particular topic of interest to that user. As the user begins typing a comment—which may be a new comment starting a new thread, a reply to an existing comment in an existing thread, and so on—the collaborative work tool can perform a semantic or sentiment analysis to determine a statistical likelihood of whether the user is intending or venturing to (1) ask a question (e.g., "does the authentication server have access this database?"), (2) provide substantive information to another user (e.g., "yes, the authentication server can access that database"), or (3) provide a minimal response to a user or a comment without substantive information in the form of affirmation, disagreement, confirmation, or recognition (e.g., "thanks!").

For example, the collaborative work tool may determine that the user is venturing to ask a question (also referred to herein as an "interrogative input type") if, as one example, a semantic analysis determines a first statistical likelihood that the input provided by the user contains interrogative language, structure, punctuation, or phrasing. In another phrasing, an optional step of a method, such as described herein, includes an operation of determining a first likelihood or other statistical prediction that the user has provided a partial or complete input that can be categorized or identified as a first input type.

Similarly, the collaborative work tool may determine a second statistical likelihood that the user is venturing to provide substantive information (also referred to herein as an "informative input type") to another user if, as one example, the collaborative work tool determines that the user has tagged, or otherwise referred to, another user and a semantic analysis determines that the input provided by the user does not contain interrogative language, structure, punctuation, or phrasing. In another phrasing, an optional step of a method, such as described herein, includes an operation of determining a second—different—likelihood or other statistical prediction that the partial or complete input provided by the user can be categorized or identified as a second input type.

Likewise, the collaborative work tool may determine a third statistical likelihood that the user is venturing to provide a minimal response (also referred to herein as an "negligible input type") if, as one example, the content input by the user has a word count less than a threshold amount. In another phrasing, another optional step of a method, such as described herein, includes an operation of determining a third—different—likelihood or other statistical prediction that the partial or complete input provided by the user can be categorized or identified as a third input type.

For convenient reference herein, some embodiments that follow reference a "heuristic" associated with a statistical confidence that a particular partial or complete input can be categorized as a particular, selected, "input type." For example, the interrogative input type can be associated with a first heuristic that determines the first statistical likelihood that the input provided by the user contains interrogative language, structure, punctuation, or phrasing. Similarly, the informative input type can be associated with a second heuristic that determines the second statistical likelihood that the user has tagged, or otherwise referred to, another user and a semantic analysis determines that the input provided by the user does not contain interrogative language, structure, punctuation, or phrasing. It may be appreciated that different input types can be classified or otherwise characterized by different heuristics; the examples provided herein are not exhaustive.

Upon determining the first, second, and third statistical likelihoods, the collaborative work tool can compare those likelihoods (corresponding to three different input types) to one or more thresholds in order to classify the likely intent or intention of the user. In still other examples, other input types apart from interrogative, informative, or negligible input types [incomplete sentence]. In some embodiments, an input type can be based—at least in part—on a sentiment analysis as well, or in the alternative.

In one example, upon classifying the user input as a question, the collaborative work tool can compare the user input provided by the user to previously-received comments that can also be classified as questions. The collaborative work tool can determine similarity between comments in a number of suitable ways. One example is by performing a topic modeling operation.

After determining that the user input is sufficiently similar to another comment classified as a question that has been previously received by the collaborative work tool, the collaborative work tool can provide a visual indication to a user (e.g., notification, pop-up box, dialog box, and the like) that the user's question may have already been asked. In some examples, the collaborative work tool may provide a link to the user that can be followed to the previously-asked question.

In other examples, the visual indication can include content from, or related to, the previously-asked question. In still further examples, the collaborative work tool may be configured to identify one or more comments containing substantive information relevant to the identified previously-asked question. In these examples, the collaborative work tool may provide a link to the substantive information and/or can include content from, or related to, the substantive information.

In another example, upon classifying the user input as containing substantive information, the collaborative work tool can compare the user input provided by the user to previously-received comments that also contain substantive information. As noted above, the collaborative work tool can determine similarity between comments in a number of suitable ways.

After determining that the user input is sufficiently similar to another comment that has been previously received by the collaborative work tool, the collaborative work tool can provide a visual indication to a user (e.g., notification, pop-up box, dialog box, and the like) that the user input may have already been received. As noted above, the collaborative work tool may provide a link to the user that can be followed to the previously-provided content or, additionally or alternatively, can include content from, or related to, the previously-provided content.

As a result of these and other described embodiments, a collaborative work tool, such as described herein, can notify a user as the user is providing input to the system that the user may be inputting information already received by the system.

These foregoing and other embodiments are discussed below with reference to FIGS. 1-5. However, those skilled in the art will readily appreciate that the detailed description given herein with respect to these figures is for explanatory purposes only and should not be construed as limiting.

FIG. 1 is a schematic representation of an example collaborative work tool. In the illustrated embodiment, the collaborative work tool 100 is implemented with a client-server architecture including a host service 102 that communicably couples (e.g., via one or more networking or wired or wireless communication protocols) to one or more client devices, one of which is identified as the client device 104. It may be appreciated that other client devices may be configured in a substantially similar manner as the client device 104, although this may not be required of all embodiments and different client devices can be configured differently and/or may transact data or information with, and/or provide input(s) to, the host service 102 in a unique or device-specific manner.

The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 can be configured to execute an application (herein referred to as a "client application") stored, at least in part, in the memory 104b. The client application is configured to access and communicate with the host service 102 and to securely transact information or data with, and provide input(s) to, the host service 102. In some embodiments, the client application may be a browser application configured to access a web page or service hosted by the host service 102 that is accessible to the client device 104 over a private or public network that may, in some embodiments, include the open internet.

In many embodiments, the host service 102 is configured to operate within or as a virtual computing environment that is supported by one or more physical servers including one or more hardware resources such as, but not limited to (or requiring) one or more of: a processor; a memory; non-volatile storage; networking connections; and the like. For simplicity of description and illustration, these example hardware resources are not shown in FIG. 1.

In many embodiments, the host service 102 can include a number of discrete subservices or purpose-configured modules, containers, or virtual machines each configured to perform, coordinate, serve, or otherwise provide one or more services, functions, or operations of the host service 102, such as the operations determining similarity between user input and content already received by the host service 102, categorizing user input as one of several types of input (e.g., questions, substantive information, minimal response, and the like), and so on.

As noted with respect to embodiments described herein, the host service 102 can be configured to implement one or more knowledge-sharing features. Examples include, but may not be limited to: comment sections; messaging platforms; knowledge stores (e.g., "wikis"); forums; and the like. For simplicity of description, the embodiments that follow reference a comment section as an example knowledge-sharing feature. It may be appreciated, however, that this is merely one example and that the embodiments described herein can be equivalently applied to other types of knowledge-sharing features and, more generally, to other portions, modules, components, or functions of a collaborative work tool.

As noted above, the collaborative work tool 100 can be configured to detect potentially redundant input/information as it is being entered by a user and, additionally, to provide a visual indication to that user that may direct the user to content relevant to that user. In one specific example, a user may begin a new comment with a title of "unreachable?" and with a body of "I tried to log into the server from my terminal unsuccessfully—is the host down for anyone else?" As the user types this content, the collaborative work tool 100 can determine that the user is asking a question and, additionally, can compare the input (including both the title and the body and/or other information, such as the user's name) to input(s) previously received by the collaborative work tool 100. For example, the collaborative work tool 100 may determine that user input is similar to another comment already received by the system having the title of "server down" and a body of "looks like the server is down—can anyone confirm?" In response to a determination that the user input is similar to a previously-received input, the collaborative work tool 100 can provide a visual indication to the user, via the client application executed by the client device 104. In some cases, the visual indication may be a notification alerting the user to a possibility that the user's question has already been asked. In these examples, the visual indication can include a link to the previously-received question. In other cases, the visual indication may be a notification alerting the user to a possibility that an answer to the user's question has already been provided by another user (e.g., if the previously-received input has been flagged as "solved" or "answered" or is otherwise followed with, referenced by, or associated with, a comment including substantive information or that is flagged as "answer" or similar).

The foregoing is merely one example; the collaborative work tool 100 can be configured to determine similarity between input provided by a user and content previously received by the collaborative work tool 100 in any suitable manner that may or may not be related to a knowledge-sharing feature of the collaborative work tool 100. For example, the collaborative work tool 100 can be configured to, without limitation: alert a user that input provided by that user attempting to answer another user's question is substantially similar to an entry in a knowledge store, suggesting to the answering user to instead link to the knowledge store in lieu of adding additional content to the collaborative work tool 100; alert a user that input provided by that user is substantially similar to a question previously asked in a different project, epic, story, or forum, suggesting to the user to provide a comment to the previously-received content that the user is also experiencing this issue in lieu of adding additional content to the collaborative work tool 100; alert a user that an input provided by that user is substantially similar to a question that has been answered in another forum, suggesting to the user to review the answer in the other forum prior to adding additional content to the collaborative work tool 100; alert a user that an input provided by that user is substantially similar to an entry in a knowledge store, suggesting to the user to review the knowledge store prior to adding additional content to the collaborative work tool 100; alert a user that an input provided by that user is substantially similar to an open issue being tracked by the collaborative work tool, suggesting to the user to review the issue store prior to adding additional content to the collaborative work tool 100; alert a user that an input provided by that user is substantially similar to another comment in the same comment thread, suggesting to the user to review the comment thread and/or comment prior to adding additional content to the collaborative work tool 100; alert a user that an input provided by that user is moderately similar to another already-answered question in the same or a different comment thread, suggesting to the user to tag a particular user or to link the input provided by the user and the previously-received input; and the like.

To facilitate these and other operations, the host service 102 includes a collaborative work interface server 106 configured to receive inputs provided by a user from the client device 104 via the network 105. As noted with respect to other embodiments described herein, as an input provided by a user—and/or portions thereof—is received from the client application 104a executed by the client device 104, the collaborative work interface server 106 can communicate with an input analysis server 108 that is trained to perform an analysis on the input provided by a user received by the collaborative work interface server 106.

In particular, in some examples, the input analysis server 108 can be configured to determine a likelihood that an input provided by a user can be categorized in a particular manner (e.g., questions, substantive information, minimal response, and the like) and/or whether a categorized input provided by a user is similar to an input previously received by the collaborative work interface server 106.

To perform these and other operations, the input analysis server 108 of the host service 102 can be trained, updated, and/or configured by analyzing a set of previous user inputs received by the collaborative work tool 100 and, in particular, the collaborative work interface server 106. Iteratively or otherwise, the input analysis server 108 can consume content associated with one or more previous user inputs of a given set of previously-received previous user inputs to assemble a database or corpus of previous user input contents.

Example previous user inputs that can be supplied to the input analysis server 108 can include, but may not be limited to: previously opened issue requests or reports tracked by an issue tracking system in communication with the collaborative work tool 100; previously closed issue requests or reports of an issue tracking system in communication with the collaborative work tool 100; previous user inputs related to a particular project; previous user inputs related to a particular epic; previous user inputs related to a particular story; previous user inputs related to a particular company or company type (e.g., software development corporation, human resources corporation, project management corporation); previous user inputs in a particular forum; content of a knowledge store; content of a forum; content of a comment section; and so on.

Data extracted from such content can be consumed by the input analysis server 108 to train and/or define one or more operations of the input analysis server 108 and can include, but may not be limited to: issue or comment title; issue or comment description; issue or comment summary; links; relationships; dependencies; projects; tags, groups, clusters, or categorizations; and so on.

The foregoing examples are not exhaustive and it may be appreciated that other data or content may be used by a collaborative work tool, such as described herein, to train, update, and/or define one or more operations of the input analysis server 108.

Thereafter, the data consumed by the input analysis server 108 can be analyzed (and, optionally, normalized, lemmatized, segmented, or otherwise preprocessed) to determine whether statistical inferences can be derived therefrom. For example, in one embodiment, text content derived from, or otherwise obtained from, previous user inputs categorized as questions, answers, substantive content, or minimal responses can each be segmented by words, phrases, or sentences to determine which content occurs most frequently in each category.

In this manner, a database of terms and phrases (collectively, herein "keywords") can be created in which certain keywords used in an input provided by a user or report are associated with a statistical likelihood that the input provided by a user is, or should be, categorized in a particular manner.

In still further examples, data consumed by the input analysis server 108 can be analyzed in a different manner to further train or define a behavior of the input analysis server 108; for example, in some embodiments, one or more topic modeling operations (e.g., Latent Dirichlet Allocation operation(s), Non-negative Matrix Factorization operation(s), and so on). In this example, clusters of (optionally, lemmatized) words or phrases related to a particular topic model or other semantic structuring can be added to a database and flagged as associated with inputs provided by a user or reports known to be associated with at least one other input provided by a user or report or, alternatively, associated with no other inputs provided by a user or reports.

It may be appreciated that the foregoing is not exhaustive; the input analysis server 108 can be trained and/or defined or configured to operate in any suitable manner. Example sets of previous user inputs that can be used to train the input analysis server 108 can include (without limitation): all previous user inputs stored by the collaborative work tool 100, regardless of client, epic, story, project, group, or otherwise; only previous user inputs associated with a particular client or business; only previous user inputs associated with a particular client or user type (e.g., large-cap companies, small-cap companies, software development companies, human resources companies, and so on); only previous user inputs associated with a particular group of users (e.g., a particular software development group); only previous user inputs associated with a particular project; only previous user inputs associated with a particular product platform (e.g., Apple iOS® software project or Google Android® software product); and so on.

The preceding examples are not exhaustive; it may be appreciated that in some embodiments training data supplied to, and consumed by, the input analysis server 108 can be limited, curated, or otherwise tailored in any suitable manner. Alternatively, training data can be entirely unlimited and may span different users, different instances of different collaborative work tools, and so on. In different embodiments, different training data—or sets of training data—may be appropriate, preferred, or otherwise used.

For example, as noted above, the input analysis server 108 can be configured to consume content of an input provided by a user as it is being entered by a user. More specifically, as a user enters content to an input provided by a user form (e.g., displayed by the display 104c of the client device 104) prior to submitting the input provided by a user to the collaborative work tool 100, the partially-complete input provided by a user content entered by the user can be received by the collaborative work tool 100. In response, the input analysis server 108 can extract keywords, perform a text normalization operation (e.g., sentence segmentation, lemmatization, stop word removal, and so on), and/or perform one or more topic modeling operations.

Thereafter, the input analysis server 108 can compare the resulting keywords, normalized text, and/or topic models (collectively, herein "extracted features") to the previously-generated database(s) of keywords, text, and/or topic models known to be associated with previous user inputs having express relationships to other previous user inputs (collectively, herein "category-signaling feature"). In a more simple phrasing, the input analysis server 108 can assemble a database of category-signaling features. If an input provided by a user includes a word or phrase that is within the database of category-signaling features, the input can be presumed to be a member of that category. For example, the interrogatory words "why," "how," "who," "when," and "what" may be determined by the input analysis server 108 as features that signal a user input category of "question;" if a user input includes any of these words, the input analysis server 108 may determine that the user is intending to ask a question.

Optionally, the input analysis server 108 can also compare the features extracted from the partially-complete input provided by a user content to the previously-generated database(s) of keywords, text, and/or topic models known to not be associated with previous user inputs having express relationships to other previous user inputs (collectively, herein "category-disqualifying features"). In a more simple phrasing, the input analysis server 108 can assemble a database of category-disqualifying features. If an input provided by a user includes a word or phrase that is within the database of category-disqualifying features, the input can be presumed to not be a member of that category. For example, the interrogatory words "why," "how," "who," "when," and "what" may be determined by the input analysis server 108 as features that disqualify a user input from being categorized as an "answer."

It may be appreciated that the input analysis server 108 can compare extracted features (e.g., from a user input) to category-disqualifying features and category-signaling feature in any number of suitable ways. Examples include, but are not limited to, calculations and/or operations to determine: Levenshtein distance; cosine similarity calculation; Manhattan distance calculation; semantic similarity; lemmatized string similarity; term frequency comparison; document or field term frequency comparisons; Jaro-Winkler distance; Jaccard similarity; and the like.

In many cases, a comparison leveraged by the input analysis server 108 can output a similarity value or score that can be compared against a similarity threshold to determine whether an extracted feature is sufficiently similar to a category-signaling feature and/or a category-disqualifying feature.

It may be appreciated that such similarity thresholds can vary from embodiment to embodiment and from comparison technique or method to comparison technique or method. For example, a similarity threshold related to a Levenshtein distance calculation may be different from a similarity threshold related to a cosine similarity calculation.

Once a determination is made by the input analysis server 108 that a particular extracted feature is sufficiently similar to one or more relationship-signaling and/or category-disqualifying features, the input analysis server 108 can determine and output a statistical confidence or value that corresponds to a likelihood that the input provided by a user should be categorized in a particular manner. For example, the input analysis server 108 may determine that an input provided by a user includes four extracted features that are sufficiently similar to entries in a category-signaling feature database associated with the category of "question" and also includes two extracted features that are sufficiently similar to entries in a category-signaling feature database associated with the category of "substantive information." In this example, the input analysis server 108 may determine a high likelihood that, because more features are associated with the category of "question," that the user intends to ask a question. Similarly, the input analysis server 108 may determine a low likelihood that, because fewer features are associated with the category of "substantive information" that the user does not intend to submit substantive information in answer to another question.

Thereafter, the determined likelihood(s) can be compared to one or more confidence threshold(s). Upon determining that the determined likelihood(s) output from the input analysis server 108 satisfy the confidence threshold(s)—which may vary from embodiment to embodiment—the input analysis server 108 can search for similar content already received by the collaborative work tool.

For example, if the user input is categorized as a question, the input analysis server 108 can search previously-received content for other questions that are similar to the user input. Similarly, if the user input is categorized as substantive information, the input analysis server 108 can search previously-received content for other content categorized as substantive information.

As noted above, it may be appreciated that the input analysis server 108 can compare user input and/or extracted features of a user input to previously-received content, or extracted features of previously received content, in any number of suitable ways. Examples include, but are not limited to, calculations and/or operations to determine: Levenshtein distance; cosine similarity calculation; Manhattan distance calculation; semantic similarity; lemmatized string similarity; term frequency comparison; document or field term frequency comparisons; Jaro-Winkler distance; Jaccard similarity; and the like.

Upon determining that the user input matches one or more previously-received content having a similar categorization, the input analysis server 108, and/or another portion of the collaborative work tool 100, can generate a signal to be communicated to the client device 104 to provide a visual indication (e.g., via the display 104c) to the user that the user may be inputting potentially redundant information. As noted above, the visual indication can be presented at any suitable time, in any suitable manner, including any suitable quantity or density of information.

Example indications include, but are not limited to: a notification to the user that the user is entering redundant content; a change to a "submit" or "save" button (e.g., disabling the button); a notification to the user that the user should review a forum post; a notification to the user that the user should ask a particular other user for assistance; a suggestion to the user to use different terminology; a suggestion to the user to review a particular comment; a suggestion to the user to review a particular child comment of a parent comment; a suggestion to the user to review a particular comment provided by a particular user; a suggestion to the user to provide more detail; a suggestion to the user to link an external resource; a suggestion to the user to cite to a particular standard, manual, or reference; and the like.

It may be appreciated that the foregoing examples are not exhaustive. More generally and broadly, it is appreciated that the collaborative work tool 100 and in particular the input analysis server 108 of the collaborative work tool 100 can be configured to leverage, utilize, or employ any suitable pattern recognition or classification algorithm, probabilistic model, machine learning technique (whether trained or untrained), artificial intelligence method, or any suitable combination thereof, to detect, define, determine, or otherwise infer one or more patterns in, and/or logical or causal relationships between, different user inputs, different issue content, successions or sequences of issues, or groups of issues reported to the collaborative work tool 100.

More generally, it may be appreciated that the collaborative work tool 100 may be configured to detect, define, determine, or otherwise infer one or more patterns, relationships, category-signaling features, and/or category-disqualifying features in, without limitation: a history or log of issues reported to the system for a particular project or epic and/or categorized or grouped in a particular manner; the time between reports of different issues having similar categorization; text content of one or more issues reported to the system; issues reported by or assigned to a particular user of the system; issues related to a particular task or story associated with a particular project tracked by the system; and the like. In response to recognizing similarity between a user input and a previously-received user input or other already-stored content, the collaborative work tool 100 can provide a recommendation to the user to review existing content prior to adding new content to the system.

Accordingly, it is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, the collaborative work tool 100 of FIG. 1 can be implemented in a number of suitable ways. As illustrated, the host service 102 includes one or more purpose-configured modules or components each configured to perform a discrete task associated with the operation of the collaborative work tool 100.

In particular, as noted above, the host service 102 includes a collaborative work interface server 106 and an input analysis server 108. It may be appreciated that although these functional elements are identified as separate and distinct "servers" that each include allocations of physical or virtual resources (identified in the figure as the resource allocations 106a and 108a, respectively)—such as one or more processors, memory, and/or communication modules (e.g., network connections and the like)—that such an implementation is not required. More generally, it may be appreciated that the various functions described herein of a host service 102 can be performed by any suitable physical hardware, virtual machine, containerized machine, or any combination thereof.

Figure 2A:
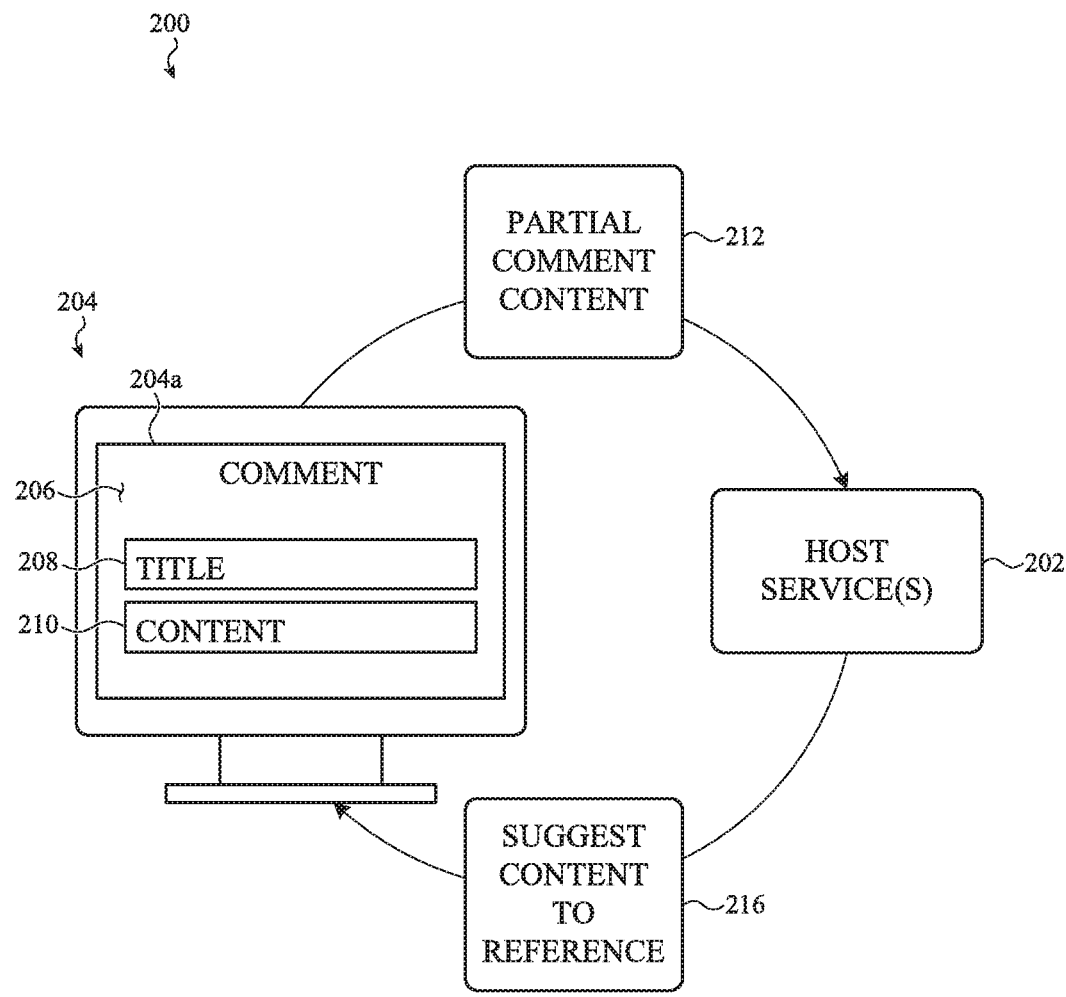
FIG. 2A is a system and process flow diagram of a knowledge-sharing feature of a collaborative work tool, such as described herein.

FIG. 2A depicts an example signal flow diagram depicting communications between a client application operating on a client device and a host service of a collaborative work tool, such as described herein. More specifically, as with the embodiment depicted in FIG. 1, the collaborative work tool 200 includes a host service 202 in communication with a client device 204.

The client device 204 can execute an instance of a client application 204a that can be configured to access one or more knowledge-sharing features of the collaborative work tool 200, such as a comment section. The client application 204a can render a graphical user interface 206.

The graphical user interface 206 can be used by a user to submit one or more inputs provided to the host service 202. More specifically, the graphical user interface 206 can render one or more data entry fields, such as the data entry fields 208, 210 illustrated in the figure, that can receive data entered by a user.

In one specific implementation of this example embodiment, a user can operate the graphical user interface 206 of the client application 204a to enter data into either or both of the data entry fields 208, 210 to generate an input 212—which can be partial or complete comment content—that can be submitted to the host service 202.

In response to receiving the input 212, the host service 202—or, more precisely, an input analysis server or service of the host service 202 (see, e.g., FIG. 1)—can perform one or more operations. For example, the host service 202 can determine whether the input 212 includes an extractable feature related to one or more category-signaling features and/or category-disqualifying features based on, without limitation: a title of the input 212 (e.g., keywords, semantic content, lemmatized content); a description of the input 212; a tag or group identifier of the input 212; and so on.

Thereafter or therewith, the host service 202 can compare the content of the input 212 to other content stored by, or accessible to (e.g., via a third-party database or internet-accessible database or service) to the collaborative work tool 200 that may, in turn, be related to still other content. For example, the host service 202 can determine that the input 212 is a question that is substantially similar to another question previously submitted to the host service 202. The host service 202 may further determine that the similar previous question is related to another comment that provides an answer to the previous question.

In response to determining that the input 212 is likely related to existing content, the host service 202 can inform the client device 204 and, in particular, the client application 204a executed by the client device 204 that the user may be entering redundant content. More simply, the host service 202 can suggest to the user (via a visual indication or notification 216) of the client device 204 that the user review content already in the system can provide a link or reference to the client device 204 of the existing content that is similar to the user input, can provide a link or reference to the client device 204 of content related to the content that is similar to the user input, and so on.

The foregoing embodiments depicted in FIGS. 1-2A and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, it may be appreciated that a user interface rendered, shown, displayed, or otherwise accessed by or generated by a client device, such as the client device 204, can take any number of suitable forms. In the same manner, any number of suitable modifications can be provided to such a user interface in order to visually emphasize to a user of the user interface one or more of, without limitation: similar information to that which the user is providing may already exist in the system; a link to similar or related information; a link to or a notification of an answer already provided to the user's question; and so on.

Figure 2B:
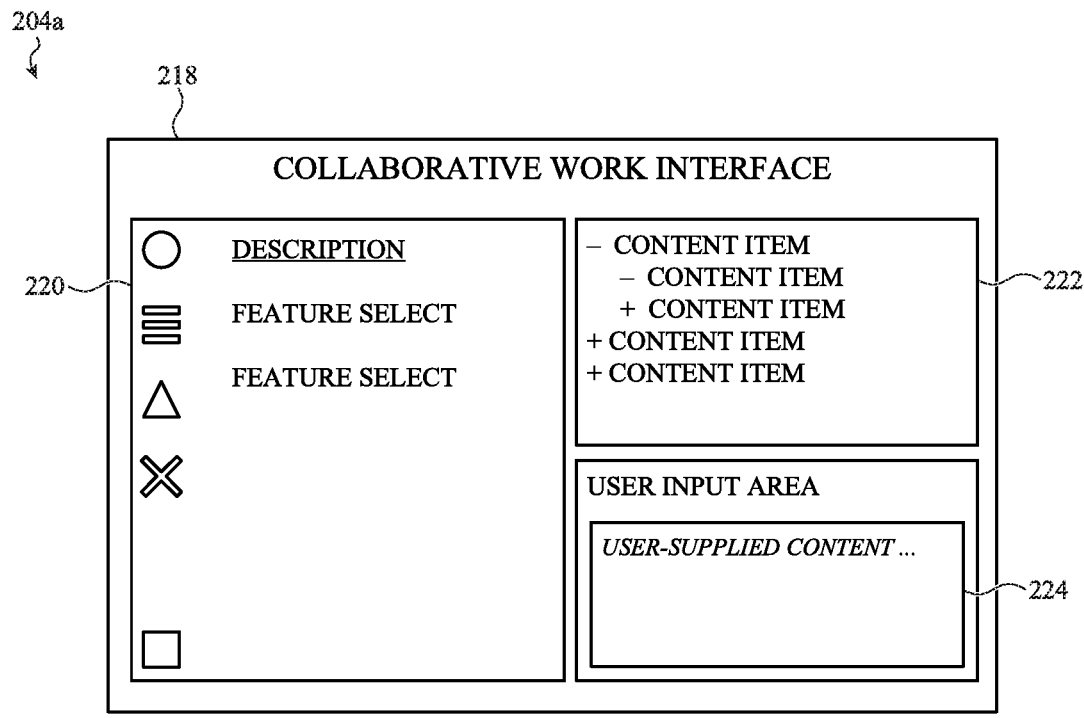
FIGS. 2B-2E depict example user interfaces that may be associated with a collaborative work tool, such as described herein.

For example, FIG. 2B depicts a collaborative work tool interface 218 that can be rendered or otherwise shown by the client application 204*a* as described above with respect to FIG. 2A. The collaborative work tool interface 218 can include a number of sections, segments, or areas that are associated with different selectable options, different information, or different tools that may be available to a user of the collaborative work tool interface 218. In the illustrated embodiment, a feature selection window 220 can be used by a user of the collaborative work tool interface 218 to select between one or more features of the collaborative work tool interface 218. Example features may include: text chat; video chat; audio chat; settings; workspace; search; knowledge-sharing features; and so on.

The collaborative work tool interface 218 can also include other sections, such as a detail view 222 of a selected knowledge sharing feature. The detail view 222 can include additional detail and/or more granular information associated with the feature selection window 220. For example, if the feature selection window 220 is operated by a user to view a comment section of a particular knowledge-sharing feature, the detail view may display a selected number of comments (e.g., sorted in a particular manner) for the user to review.

The collaborative work tool interface 218 can further include one or more regions or areas to receive user input. For example, in the illustrated embodiment, the collaborative work tool interface 218 includes the user input area 224 that can include one or more forms or fields to which input can be provided by a user of the collaborative work tool interface 218.

As noted with respect to other embodiments described herein, the collaborative work tool interface 218 can be configured to provide a visual indication to the user in response to a determination that content presently or already entered by the user is similar to other content previously received by the system. Examples include: a comment providing an answer to a question posed in a comment section has already been provided; a comment asking a question on a particular subject has already been asked; a suggestion to add content to a Wiki article has already been honored; and so on.

Figure 2C:
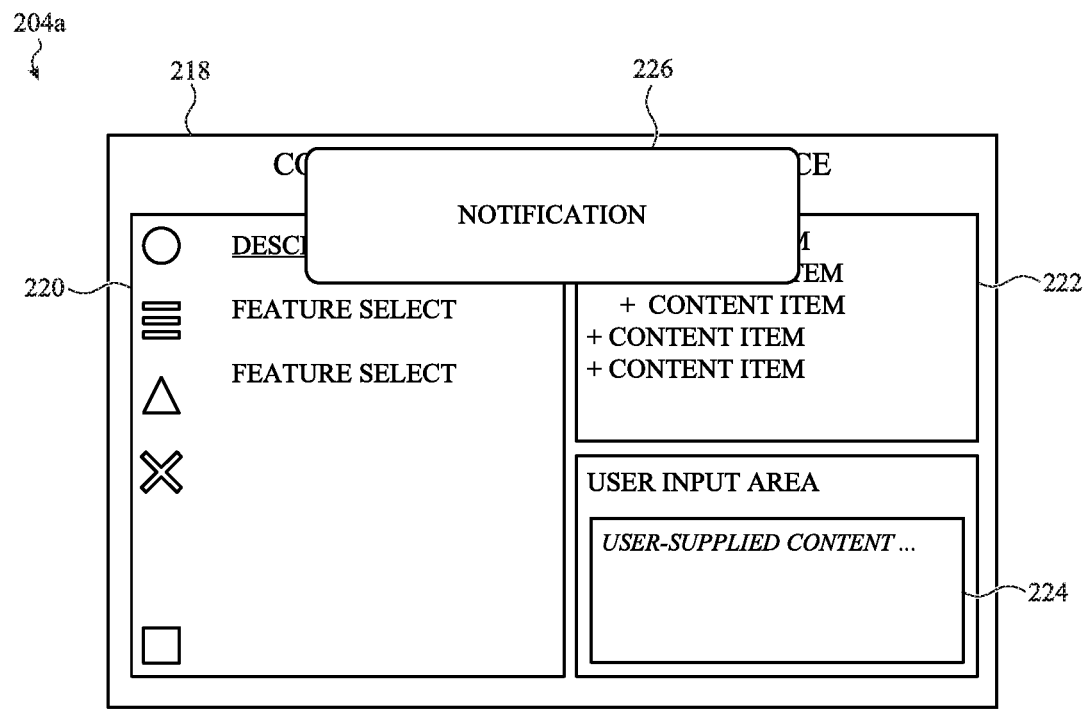

One example of such a visual indication is a notification. FIG. 2C depicts a notification 226 that is provided as an overlay to inform the user that user-supplied content provided by the user to the user input area 224 may be redundant to information already-received by the system.

Although the notification is shown as an overlay, it is appreciated that this is merely one example and is not required; other example notifications are possible.

Figure 2D:
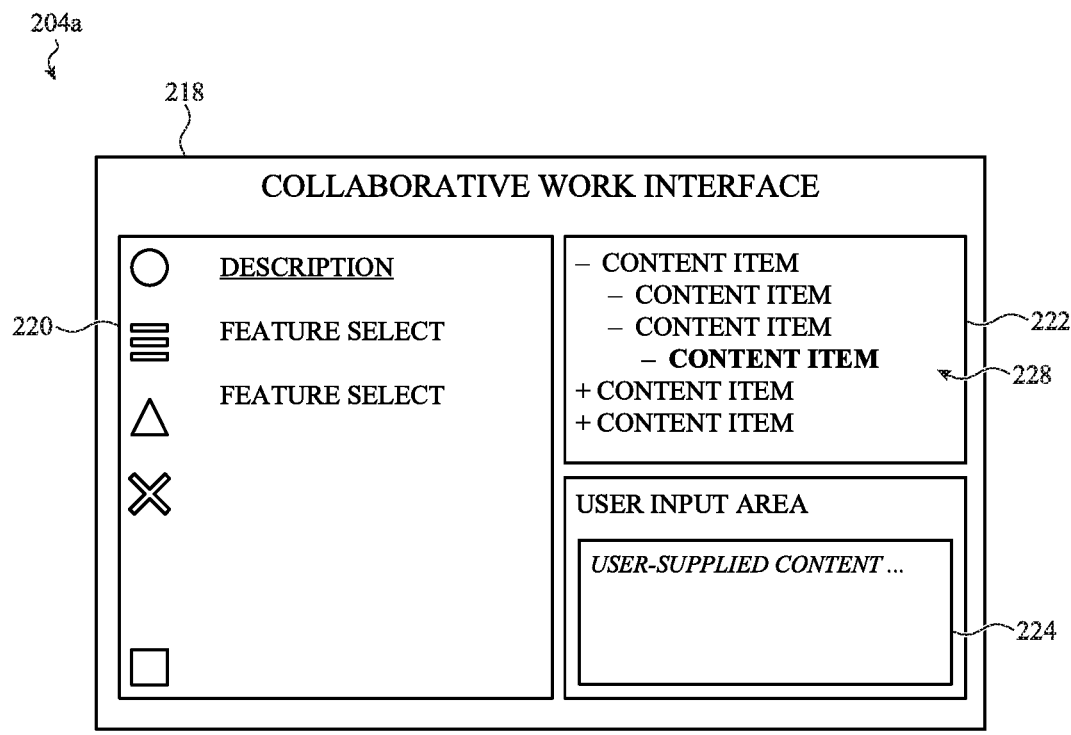

Another example of a visual indication to a user is shown in FIG. 2D. In this example, a content item 228 shown in the detail view 222 of a selected knowledge sharing feature is shown and visually distinguished from adjacent content items. In the illustrated example, the content item 228 is emboldened to provide contrast that is visually appealing and attractive to a user of the system. In this example, although not required, a parent content item to the content item 228 is expanded as a part of the operation of emphasizing the existence and/or content of content item 228. It may be appreciated that the depicted means of emphasizing the content item 228 is merely one example. In other cases, without limitation, the content item 228 may be: animated; highlighted; outlined; underlined; italicized; flashed; colored; enlarged; moved; or otherwise or any combination thereof.

Figure 2E:
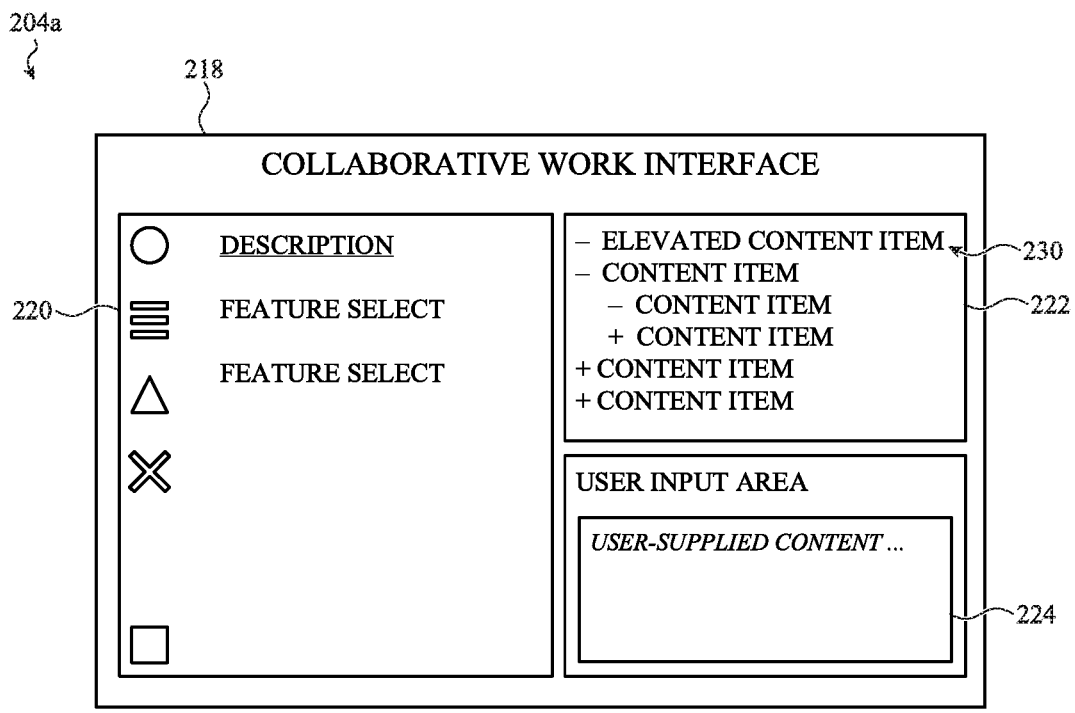

Yet another example of a visual indication to a user is shown in FIG. 2E. In this example, a content item 230 shown in the detail view 222 of a selected knowledge-sharing feature is shown and visually separated from adjacent content items. In the illustrated example, the content item 230 is elevated (e.g., "bubbled up") above all other (or at least some other) content items shown in the detail view 222. In this manner, a user of the system can be encouraged to draw attention to the content item 230.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
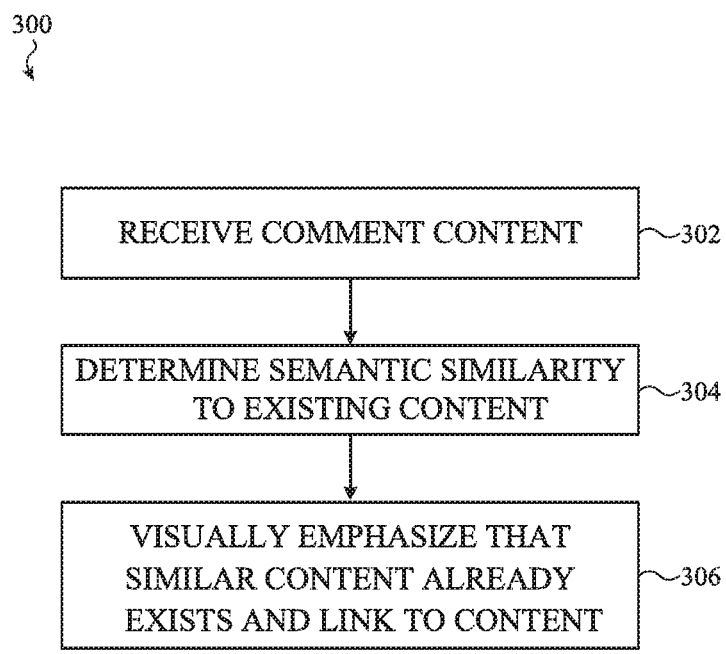
FIG. 3 is a flow chart that depicts example operations of a method of detecting entry of redundant content in a knowledge-sharing feature of a collaborative work tool, such as described herein.
Figure 4:
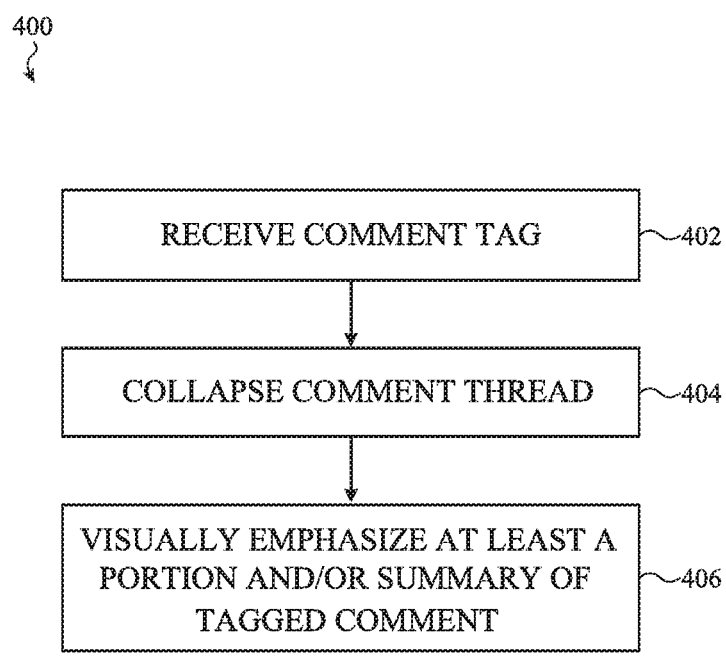
FIG. 4 is a flow chart that depicts example operations of a method of preventing entry of redundant content in a knowledge-sharing feature of a collaborative work tool, such as described herein.
Figure 5:
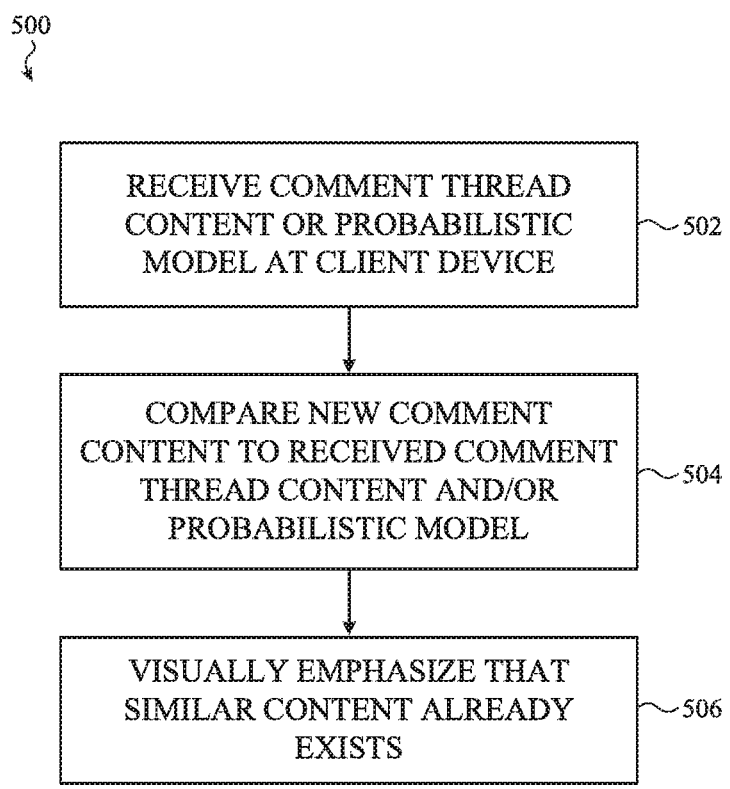
FIG. 5 is a flow chart that depicts example operations of another method of detecting entry of redundant content in a knowledge-sharing feature of a collaborative work tool, such as described herein.

Generally and broadly, FIGS. 3-5 depict flow charts corresponding to example simplified methods of operating a system, such as described herein.

FIG. 3 is a flow chart that depicts example operations of a method of detecting entry of redundant content in a knowledge-sharing feature of a collaborative work tool, such as described herein. The method 300 can be performed by any hardware or software, whether virtual or otherwise, such as described herein. In one example, the method 300 is performed, in whole or in part, by an input analysis server, such as described above.

The method 300 includes operation 302 in which content is received from a user in the form of a comment. Next, at operation 304, the system can determine whether the content received from the user exhibits similarity to any content previously received by the system. One example method by which a similarity between the user input and content previously received by the system can include a semantic similarity calculation or determination.

As noted above, the similarity can be determined in a number of ways. In some examples, content received at operation 302 can be categorized as one of several types of user input. As noted above, example categories of user input can include, but may not be limited to: questions; substantive information; minimal information; and the like. In other cases, other categories are possible. In these examples, once an input provided by a user is categorized, the system may be configured to compare the user input to previously-received inputs and/or other existing content that may be categorized in the same manner. In other cases, categorization prior to a determination of similarity to existing content may not be required. Upon determining existence of similar content, the method 300 advances to operation 306 in which a visual indication is provided to the user that similar content already exists in the system.

FIG. 4 is a flow chart that depicts example operations of a method of preventing entry of redundant content in a knowledge-sharing feature of a collaborative work tool, such as described herein.

The method 400 includes operation 402 in which a comment received by a collaborative work tool is tagged by a user with a particular tag or category. In some examples, the tag can include or can be associated with an indication that the comment contains substantive information relevant to a question asked by a user. An example tag may be "solved" or "answered" or "solution." In some cases, tagging and/or categorization of comments can be completed automatically. For example, as noted above, a categorization operation can be performed by an input analysis server, such as described herein.

Next, at operation 404, the method 400 advances to collapse a comment thread in order to more efficiently utilize space in a graphical user interface. As a result of the collapsed comment thread, the method 400 can advance to operation 406 in which all or some comment(s) which are tagged with a particular tag are elevated and/or otherwise visually emphasized to draw the attention of a user.

As a result of this construction and/or technique, relevant information to a particular comment thread can be visually emphasized to a user without requiring that the user review the entirety of a particular comment thread. In some cases, the operations 402-406 can be performed in response to a user providing a particular user input.

FIG. 5 is a flow chart that depicts example operations of another method of detecting entry of redundant content in a knowledge-sharing feature of a collaborative work tool, such as described herein.

The method 500 is typically performed, in whole or in part, by a client application that is communicably coupled to a collaborative work tool, such as described herein. In these embodiments, the method 500 includes operation 502 in which the entire content of a comment thread and/or a probabilistic model (e.g., bloom filter) can be transmitted to the client application operating on a client device. Thereafter, at operation 504, the client device can compare, locally, content input by a user to the client application to the data received at operation 502 to determine whether any similarity is exhibited. Finally, at operation 506, content that is determined by the client device to be similar to content received at operation 502 can be visually emphasized to the user. As a result of the construction, certain processing operations can be offloaded wholly or in part to client devices; this architecture can dramatically improve the function of a collaborative work tool.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method for reducing redundancy in a collaborative work tool, the method comprising:
    rendering an input area in a graphical user interface of a client application communicably coupled to a host service to receive a user input;
    receiving, at the host service of the collaborative work tool, a partial input being provided by a user to a knowledge-sharing feature of the collaborative work tool via the client application;
    selecting, while the user continues to provide input, an input type characterizing the partial input already received based on the greater of:
        a first statistical likelihood that the partial input corresponds to a question, based on a first heuristic; and
        a second statistical likelihood that the partial input corresponds to a statement, based on a second heuristic;
    identifying at least one previously-received input to the knowledge-sharing feature to display to the user via the graphical user interface by:
        in response to determining that the input type is an interrogative input type:
            querying the knowledge-sharing feature for a first result comprising previously-received inputs of the interrogative input type; and
            determining that at least one of the previously-received inputs of the first result exhibits a semantic similarity to the partial input, the semantic similarity exceeding a threshold;
            selecting a second previously-received input having an informative input type and that was provided in response to the at least one of the previously-received inputs; and
            providing a visual indication to the user that the partial input may be redundant to the second previously-received input; and
        in response to determining that the input type is an informative input type:
            querying the knowledge-sharing feature for a second result comprising a third previously-received input having an informative input type, that exhibits semantic similarity to the partial input, and that was provided in response to a fourth previously-received input having an interrogative input type; and
            providing a visual indication to the user that the partial input may be redundant to the third previously-received input.

2. The method of claim 1, wherein:
    a first input type is an interrogative input type;

a second input type is an informative input type;
the first heuristic is a first determination that the partial input contains interrogative language, structure, punctuation, or phrasing;
the second heuristic is a second determination that the partial input does not contain interrogative language, structure, punctuation, or phrasing;
upon the first determination, increasing the first statistical likelihood that the partial input is the interrogative input type and decreasing the second statistical likelihood that the partial input is the informative input type; and
upon the second determination, increasing the second statistical likelihood that the partial input is the informative input type and decreasing the first statistical likelihood that the partial input is the interrogative input type.

3. The method of claim 2, wherein:
the second determination further comprises determining that the partial input includes a reference to at least one previously-received input; and
upon the second determination, increasing the second statistical likelihood that the partial input is the informative input type.

4. The method of claim 3, wherein:
the second determination further comprises determining whether the partial input includes at least a threshold number of words or terms; and
upon the second determination, increasing the second statistical likelihood that the partial input is the informative input type.

5. The method of claim 2, wherein:
the second heuristic corresponds to a second determination of whether the partial input is tagged with a selected tag; and
upon the second determination, increasing the second statistical likelihood that the partial input is the informative input type.

6. The method of claim 2, wherein the second heuristic corresponds to a second determination of whether the partial input links to another input stored by the knowledge-sharing feature.

7. The method of claim 1, wherein providing a visual indication comprises instructing the client application to provide a notification to the user.

8. The method of claim 1, wherein providing a visual indication comprises instructing the client application to provide a link to the previously-received input.

9. The method of claim 1, wherein the previously-received input comprises one or more of:
an article of a knowledge store;
a comment in a comment section;
a message stored by a messaging platform; or
a forum post.

10. A method for reducing redundancy in a collaborative work tool database, the method comprising:
receiving, at a client application of a collaborative work tool, a first partial input provided by a user to the collaborative work tool while the user continues to provide input;
determining, by the client application, a statistical likelihood that the, already received, first partial input is one of an interrogative input type or a statement input type based on a determination of whether the first partial input contains one or more of interrogative language, structure, punctuation, or phrasing;
in response to determining that the first partial input is of an interrogative input type:
selecting from the collaborative work tool database a second input, previously received in the collaborative work tool database based on a determination that the second input exhibits semantic similarity to the partial input, the semantic similarity exceeding a threshold, the second input being of the interrogative input type;
selecting from the collaborative work tool database a third input, previously received in the collaborative work tool database after the second input was received in the collaborative work tool database, the third input being of a statement input type and being provided in response to the second input; and
providing a visual indication to the user that emphasizes the third input in a graphical user interface; and
in response to determining that the first partial input is of a statement input type:
querying the collaborative work tool database for a fourth input previously received in the collaborative work tool database, the fourth input having a statement input type and having been provided in response to a fifth input having an interrogative input type; and
providing a visual indication to the user that emphasizes that the partial input may be redundant to the fourth input.

11. The method of claim 10, wherein the first input is provided to a graphical user interface associated with a knowledge-sharing feature of the collaborative work tool.

12. A collaborative work tool for emphasizing existing content to a user of a client application on a client device communicably coupled to the collaborative work tool, the collaborative work tool comprising:
a processor allocation and a memory allocation, the processor allocation configured to access the memory allocation to instantiate a host service providing back-end server functionality for the collaborative work tool; and
a database communicably coupled to the host service; wherein the host service is configured to:
wherein the host service is configured to:
receive an input from the user via the client application on the client device;
classify the input as an input type selected from one of a first input type or a second input type different from, and mutually exclusive with, the first input type;
in response to determining that the input is of the first input type:
access the database to identify a first previously-received input of the first input type, the previously-received input exhibiting a semantic similarity to at least a portion of the input, the semantic similarity exceeding a threshold;
access the database to identify a second previously-received input associated with, and received after, the first previously-received input, the second previously-received input having the second input type; and
generate a signal to the client application via the client device to display the first and second previously-received input on the client application and to visually emphasize at least one of the first and second previously-received input to the user; and in response to determining that the input is of the second input type:
  access the database to identify a third previously-received input of the second input type and exhibiting a semantic similarity to the input, the third previously-received input having been provided in response to a fourth previously-received input of the first input type; and
  generate a signal to the client application via the client device to display a visual indication that the input may be redundant to the third previously-received input.

13. The collaborative work tool of claim 12, wherein the input and at least one of the first or second previously-received input are each comments in a comment section of a knowledge-sharing feature of the collaborative work tool.

14. The collaborative work tool of claim 12, wherein the input comprises a partial user input received while the user continues to provide input to the client application.

15. The collaborative work tool of claim 12, wherein visually emphasizing the at least one of the first and second previously-received input to the user comprises sending a signal from the host service to the client application to provide a notification to the user.

* * * * *